United States Patent
Malloy et al.

(10) Patent No.: US 8,990,061 B2
(45) Date of Patent: Mar. 24, 2015

(54) TRACKING, ANALYZING, AND VISUALIZING APPLICATION DELAY

(75) Inventors: Patrick J. Malloy, Washington, DC (US); Mahesh Lavannis, Rockville, MD (US); Marc Schneider, Arlington, VA (US); John Strohm, Bethesda, MD (US); Alain Cohen, Washington, DC (US); Sukanya Sreshta, Rockville, MD (US); Jerome Plun, Alexandria, VA (US); Stephen Pendleton, Washington, DC (US)

(73) Assignee: Riverbed Technology, Inc., San Francisco, CA (US)

( * ) Notice: Subject to any disclaimer, the term of this patent is extended or adjusted under 35 U.S.C. 154(b) by 2886 days.

(21) Appl. No.: 11/358,538

(22) Filed: Feb. 21, 2006

(65) Prior Publication Data

US 2006/0190231 A1    Aug. 24, 2006

Related U.S. Application Data

(60) Provisional application No. 60/654,094, filed on Feb. 18, 2005.

(51) Int. Cl.
*G06F 9/44*    (2006.01)
*G06F 17/50*    (2006.01)
*H04W 16/22*    (2009.01)

(52) U.S. Cl.
CPC ........ *G06F 17/5009* (2013.01); *G06F 2217/10* (2013.01); *H04W 16/22* (2013.01)
USPC ............. 703/21; 370/252; 370/235; 370/389; 370/470; 709/238; 709/229; 703/20; 703/22; 455/444; 455/41.2; 455/73

(58) Field of Classification Search
USPC .......................................................... 703/14
See application file for complete search history.

(56) References Cited

U.S. PATENT DOCUMENTS 6,820,042 B1    11/2004  Cohen et al.

OTHER PUBLICATIONS

Demaine, Erik. "Efficient Simulation of Message-Passing in Distributed-Memory Architectures", Waterloo, Ontario, Canada 1996.*
Haddad et al. "Network Simulator 2: a Simulation Tool for Linux", Oct. 2002.*
Antoniou et al. "Seacorn: Specification of Simulation Environment", Oct. 2002.*
Heath et al. "ParaGraph: A Tool for Visualizing Performance of Parallel Programs", Sep. 1994.*
Khanvilkar et al. "Tool Integration for Flexible Simulation of Distributed Algorithms", Softw. Pract. Exper. 2001.*

* cited by examiner

*Primary Examiner* — Omar Fernandez Rivas
*Assistant Examiner* — Cuong Luu
(74) *Attorney, Agent, or Firm* — Park, Vaughan, Fleming & Dowler LLP

(57) ABSTRACT

Performance metrics related to the processing and propagation of messages related to select applications are collected during a simulation of a network. Each message associated with an application is tagged, and each simulated packet that contains some or all of a tagged message is correspondingly tagged to facilitate the creation of transmit records and receive records. A post processor is configured to collate transmit and receive records of each tagged message to identify delays associated with each node that processes the message, and each link that propagates the message from node to node within the network. The processed timing information is provided to the user via an interactive user interface that allows the user to view the timing information from an application layer perspective.

54 Claims, 4 Drawing Sheets

| | A | B | C | D | E | F | G | H | I | J | K | L | M |
|---|---|---|---|---|---|---|---|---|---|---|---|---|---|
| 1 | View by Message then Link/Node | | | | | | | | | | | | |
| 2 | | | | | | | | | | | | | |
| 3 | | Star | End | Duratio | Droppe | Avg. Tr | Max | Prop | Avg F | Max | Trans | Dur | GANNT |
| 4 | Client 1 | | | 22 (avg) | | | | | | | | | |
| 5 | Transaction type A | | | 22 (avg) | | | | | | | | | |
| 6 | Transaction instance 1 | 0 | 22 | 22 | | | | | | | | | one block |
| 7 | Network | | | 12 | 23 | 1.5 | 2 | | 0.2 | 0.2 | | | blocks of |
| 8 | Application | | | 10 | | | | | | | | | blocks of |
| 9 | Tier Pair 1<->2 | 0 | 22 | 22 | 23 | 3 | 5 | | 0.2 | 0.2 | | | blocks of |
| 10 | Message1 1->2 | 0 | 22 | 22 | 23 | 3 | 5 | | 0.2 | 0.2 | | | block of |
| 11 | Link1 | | | | 1 | 1.5 | 2 | | 0.2 | 0.2 | | | |
| 12 | Packet (bytes 0 - 5000) | 1 | 2 | 1 | | | | 0.2 | | | | | block of |
| 13 | Packet (bytes 5001 - 1000 | 2.5 | | | Dropped | | | | | | | | red 'X' at |
| 14 | Packet (bytes 5001 - 1000 | 3 | 5 | 2 | | | | 0.2 | | | | | block of |
| 15 | Node1 | | | | 22 | 4.5 | 5 | | | | | | |
| 16 | Packet (bytes 0 - 5000) | 5 | 9 | 4 | | | | | | | | | block of |
| 17 | Packet (bytes 5001 - 1000 | 10 | 15 | 5 | | | | | | | | | block of |
| 18 | | | | | | | | | | | | | |
| 19 | | | | | | | | | | | | | |
| 20 | View by Link/Node then Message | | | | | | | | | | | | |
| 21 | | | | | | | | | | | | | |
| 22 | | Star | End | Duratio | Droppe | Avg. Br | Max | Prop | Avg F | Max | Trans | Link | Protocol/Cc |
| 23 | Client 1 | | | 22 (avg) | | | | | | | | | |
| 24 | Transaction type A | | | 22 (avg) | | | | | | | | | |
| 25 | Transaction instance 1 | 0 | 22 | 22 | | | | | | | | | |
| 26 | Network | | | 12 | 23 | 1.5 | 2 | | 0.2 | 0.2 | | | blocks of |
| 27 | Application | | | 10 | | | | | | | | | |
| 28 | Tier pair 1<->2 | 0 | 22 | 22 | 23 | 3 | 5 | | 0.2 | 0.2 | | | |
| 29 | Link1 | | | | 1 | 1.5 | 2 | | 0.2 | 0.2 | | | |
| 30 | Message1 1->2 | NA | NA | NA | 1 | 1.5 | 2 | | 0.2 | 0.2 | | | |
| 31 | Packet (bytes 0 - 5000) | 1 | 2 | 1 | | | | 0.2 | | | | | |
| 32 | Packet (bytes 5001 - 1000 | 2.5 | | | Dropped | | | | | | | | red 'X' at |
| 33 | Packet (bytes 5001 - 1000 | 3 | 5 | 2 | | | | 0.2 | | | | | |
| 34 | Node1 | | | | 22 | 4.5 | 5 | | | | | | |
| 35 | Message1 1->2 | | | | 22 | 1.5 | 2 | | | | | | |
| 36 | Packet (bytes 0 - 5000) | 5 | 9 | 4 | | | | | | | | | |
| 37 | Packet (bytes 5001 - 1000 | 10 | 15 | 5 | | | | | | | | | |
| 38 | | | | | | | | | | | | | |
| 39 | | | | | | | | | | | | | |
| 40 | | | | | | | | | | | | | |
| 41 | View by Message then Link/Node with Client and Transaction Type | | | | | | | | | | | | |
| 42 | | Star | End | Duratio | Droppe | Avg. Br | Max | Prop | Avg F | Max | Prop | | GANNT |
| 43 | Client 1 | | | Avg = 32.5 | | | | | | | | | |
| 44 | Transaction Type 1 | | | Avg = 23.5 | | | | | | | | | |
| 45 | transaction instance 1 | 0 | 22 | 22 | | | | | | | | | one block |
| 46 | network | | | 12 | 23 | 1.5 | 2 | | 0.2 | 0.2 | | | blocks of |
| 47 | application | | | 10 | | | | | | | | | blocks of |
| 48 | tier pair 1<->2 | 0 | 22 | 22 | 23 | 3 | 5 | | 0.2 | 0.2 | | | blocks of |
| 49 | message1 1->2 | 0 | 22 | 22 | 23 | 3 | 5 | | 0.2 | 0.2 | | | block of |
| 50 | Link1 | | | | 1 | 1.5 | 2 | | 0.2 | 0.2 | | | |
| 51 | packet 0 - 5000 | 1 | 2 | 1 | | | | 0.2 | | | | | block of |
| 52 | packet 5001 - 10000 | 2.5 | | | Dropped | | | | | | | | red 'X' at |
| 53 | packet 5001 - 10000 | 3 | 5 | 2 | | | | 0.2 | | | | | block of |
| 54 | Node1 | | | | 22 | 4.5 | 5 | | | | | | |
| 55 | packet 0 - 5000 | 5 | 9 | 4 | | | | | | | | | block of |
| 56 | packet 5001 - 10000 | 10 | 15 | 5 | | | | | | | | | block of |
| 57 | | | | | | | | | | | | | |
| 58 | View by Tier Pair | | | | | | | | | | | | |
| 59 | | | | | | | | | | | | | |
| 60 | | | | | | | | | | | | | |
| 61 | | | | | | | | | | | | | |
| 62 | | | | | | | | | | | | | |

FIG. 5

TRACKING, ANALYZING, AND VISUALIZING APPLICATION DELAY

This application claims the benefit of U.S. Provisional Patent Application 60/654,094, filed 18 Feb. 2005.

BACKGROUND AND SUMMARY OF THE INVENTION

This invention relates to the field of network analysis, and in particular to the simulation and capture of message and packet transmissions corresponding to select applications.

Network simulation is commonly used to design and maintain communication networks. Proposed networks are modeled and simulated to estimate and/or verify the expected performance of the network. Existing networks are modeled and simulated to determine the effects of proposed changes to the network, or to facilitate the diagnosis of unexpected network degradation.

Generally, networks are modeled down at the transport protocol layer, wherein the simulation models the transport of discrete packets among nodes in the network. Traffic approximating the expected traffic in the actual network is simulated and the nodes in the modeled network simulate the processing and propagation of this traffic through the network. Based on this simulation of packet flow, the network performance measures for the nodes and links of the network can be estimated, such as propagation and queuing delays, drop rates, retransmission rates, and so on, In this manner, for example, bottle-necks in network can be identified, and changes to the network simulated to determine whether such bottle-necks are relieved by the changes.

Simulation is also used to determine how well the network performs when running a variety of select applications, to verify the network's suitability for running these applications, as well as identifying any potential problems with running each application in this network environment. Although a simulation of an application operating solely on the network may identify particular performance limitations for that application, these problem areas may not be the primary causes of performance problems when the application runs concurrently with other applications on the network. Therefore, simulations are generally performed wherein the application is simulated with traffic from other applications.

Although network simulation is very effective for determining overall network characteristics at the transport layer, considerable expertise and additional analysis are required to determine how the behavior of the network limits or enhances the performance of any particular application in a multi-application simulation. For example, in a distributed data base application, the provider of the application may be interested in determining the bottle-necks in the application, and such bottle-necks do not necessarily correspond to the network bottle-necks. A particular set of links may be bottle-necks to a network, but unless those links are used by the application, they will not be the cause of any performance limitations associated with the application. In like manner, a set of nodes or links may exhibit acceptable overall throughput, with relatively few peak or overload demand intervals, and thus not identified as areas of the network that require improvement; but, if these peak demands are correlated to the application, an improvement may be required to properly support this application.

It is an objective of this invention to facilitate the analysis of the performance of an application that is configured to operate via network communications. It is a further objective of this invention to provide a schema for tracking simulated communications related to select applications.

These objectives, and others, are achieved by a method and system that facilitate the capture of performance metrics related to the processing and propagation of messages related to select applications during a simulation of a network. Each message associated with an application is tagged, and each simulated packet that contains some or all of a tagged message is correspondingly tagged to facilitate the creation of transmit records and receive records. A post processor is configured to collate transmit and receive records of each tagged message to identify delays associated with each node that processes the message, and each link that propagates the message from node to node within the network. The processed timing information is provided to the user via an interactive user interface that allows the user to view the timing information from an application layer perspective.

BRIEF DESCRIPTION OF THE DRAWINGS

The invention is explained in further detail, and by way of example, with reference to the accompanying drawings wherein:

FIG. 5 illustrates an example table of application level timing parameters and statistics.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1:
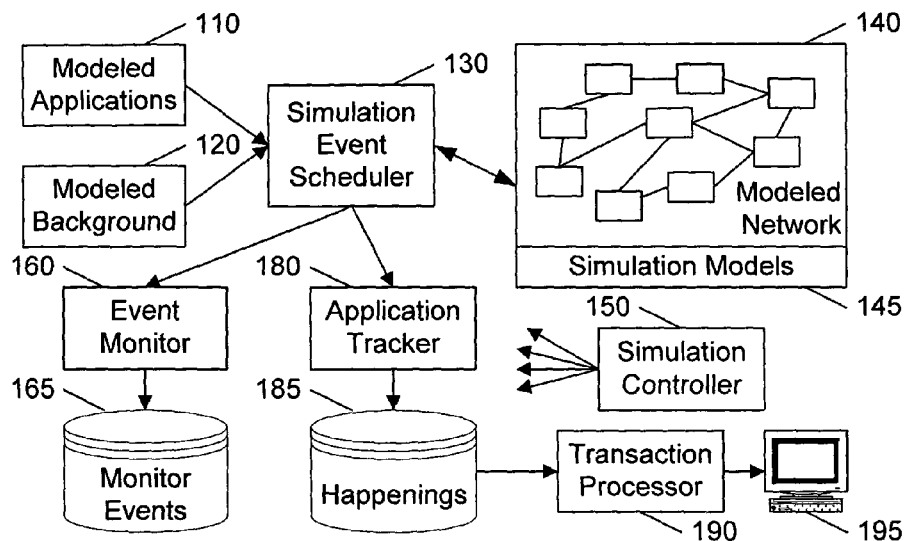
FIG. 1 illustrates an example block diagram of a simulation system.

FIG. 1 illustrates an example block diagram of a simulation system. A proposed or existing network is modeled 140, using predefined models of network components 145. To determine or estimate the performance of this modeled system, the reaction of the system to a series of events is determined. These events are typically generated using models of particular applications 110, or models of general background traffic 120, as disclosed, for example, in U.S. Pat. No. 6,820,042

"MIXED MODE NETWORK SIMULATOR", issued 16 Nov. 2004 to Alain Cohen, George Cathey, and Patrick J. Malloy, which is incorporated by reference herein. These generated events are applied to the modeled network 140, and the network 140 generates subsequent events in reaction to these events. A modeled application 110, for example, may generate a packet at a source node for transmission to a destination node. Within the modeled network, the source node may queue the packet for transmission to a router within the network, then subsequently transmit the packet to the router. The router similarly receives, queues, and transmits the packet to its next destination; and so on. A scheduler 130 coordinates the processing of each of these generated events, and a monitor 160 stores select events 165 for subsequent display or further post-processing. A controller 150 coordinates the interaction of each of the illustrated components of the simulation system, as well as other components, such as a user interface, file controller, and so on.

In a conventional simulator, the packets that are simulated as being propagated through the network contain information similar to the control information contained in actual communication packets, such as an identification of source and destination nodes, packet size, priority, and so on. As in an actual packet, the control information does not identify the application 110 that initiated the events that caused each packet to be transmitted. Further compounding the disassociation between applications 110 and particular packets, some network elements may be configured to combine received packets to form larger transmission packets, or to partition received packets into smaller transmission packets.

Because of this disassociation between packets that flow through a network and the applications that cause these packets to flow, it is often difficult or impractical to assess application-related performance based on a simulation of packet flow through the network. That is, for example, in a conventional simulator, it is difficult to answer questions such as:

Which are the slowest applications?
Does a particular application spend more time processing or communicating?
Where are the network bottlenecks for a particular application?
Where are packets from a particular application dropped most often?

In accordance with an aspect of this invention, the simulation system allows a user to identify one or more applications of interest, and includes an application tracker 180 that is configured to store records 185 associated with each packet that is caused to be transmitted by these applications, to facilitate the determination of timing parameters related to each application. Each message that is generated by the select application(s) is "tagged", and this tag is used to tag each packet that includes some or all of each message. The term 'happening' or 'transmit/receive record' is used hereinafter to distinguish the records 185 related to application-tagged packets from the 'events' 165 related to packets that a conventional simulation system may store. For ease of reference and understanding, these happenings 185 are illustrated as being stored and processed independent of the events 165. One of ordinary skill in the art will recognize, however, that these records 165, 185 may be stored in a common storage area, and, will recognize that these records 165, 185 may merely be particular data fields in a single record. The particular form of these records is independent of the principles of this invention, although the maintenance of happenings 185 independent of events 165 is generally preferred.

Figure 2A:
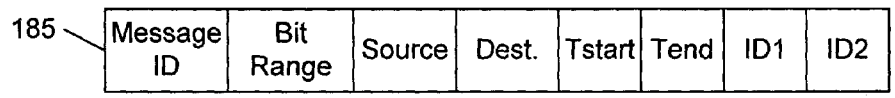
FIG. 2A illustrates an example format of a transmit/receive record.

FIG. 2A illustrates an example form of a happening record 185, comprising six fields. One of ordinary skill in the art will recognize that additional or fewer fields may be used in alternative embodiments. In the context of this disclosure, a happening record 185 records the transmission or reception of some or all of a message that is associated with a selected application. A message ID field provides an identifier of the message, preferably indicating, directly or indirectly, the application to which this message is associated. Because some transmissions or receptions may include only a part of the message, the bit range field is used to identify the portion of the message corresponding to the particular transmit or receive happening. Source and destination fields identify the transmitting and receiving nodes, and Tstart and Tend identify the beginning and ending time of the happening.

In a preferred embodiment, the transmit happening start time Tstart is the time that the packet is available for transmission (i.e. after packet generation, and before transmit queuing, if any). The transmit happening end time Tend is the time that the first bit of the packet is transmitted from the transmitter (i.e. after propagation through the transmit queue and transfer to the transmission media). The receive happening start time Tstart is the time that the first bit of the packet arrives at the receiver. The receive happening end time Tend is the time that the last bit of the packet arrives at the receiver. The use of these timing parameters to distinguish different phases related to the communication and processing of packets is detailed further below; other definitions of timing parameters may be used as well, if different phases are to be distinguished, depending upon the functions performed in the corresponding simulation models.

Two transaction identifier fields ID1, ID2 are used to distinguish happenings, and to facilitate the correlation of transmit and receive happenings. Of particular note, each transmission of a packet generates a transmit happening that includes a unique identifier that is stored in field ID2 of the transmit happening. That is, if a packet is retransmitted, the happening corresponding to the retransmission of the packet will have a different second transmit transaction identifier ID2. In a preferred embodiment, the unique identifier is a monotonically increasing parameter, such as an incremental counter, to facilitate the sorting of happenings as detailed further below.

Upon receipt of each packet, a receive happening is generated, and the transmit happening ID2 is copied into the receive happening's ID1. If the packet is simulated as being dropped during transmission, to simulate errors at the physical layer, for example, the receive happening will not be generated, and the absence of a receive happening ID1 that matches a transmit happening's ID2 is used to identify such "link drops".

When a node processes and forwards a message, the receive happening's ID1 is copied into the transmit happening's ID1. If the packet is simulated as being (erroneously) dropped during processing at the node, the absence of a transmit happening ID1 that matches a receive happening's ID1 is used to identify such "node drops".

Figure 2B:
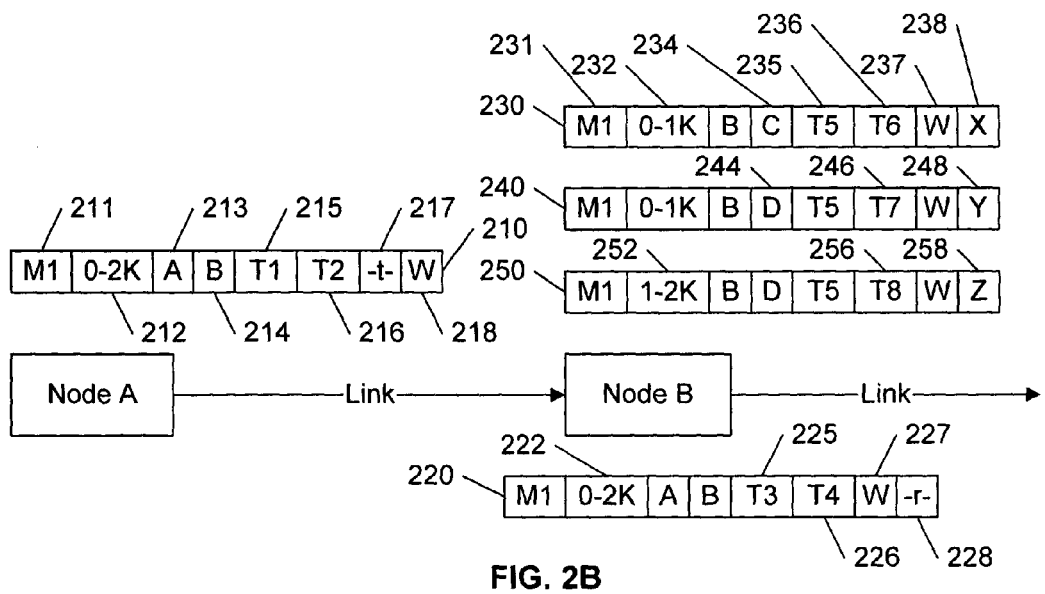
FIG. 2B illustrates an example set of transmit and receive records at two nodes.

FIG. 2B illustrates example transmit and receive happenings as packets are transmitted between nodes. In this example, node A generates a message M1 that is forwarded through node B.

A transmit happening 210 is generated when a packet containing some or all of the message M1 is transmitted from node A. This happening 210 includes the message identifier (M1) 211; the bit range (0-2K) 212 that identifies which bits of the message are contained in the transmitted packet; the source (A) 213 and destination (B) 214 of the packet; transmit start (T1) 215 and stop (T2) 216 times (as defined above); and transaction identifiers (-t-) 217 and (W) 218.

The transmit first transaction identifier, ID1 (-t-) 217 in this example, is a particular identifier that identifies this packet as being generated at the current node (A), to distinguish the packet from one that is being relayed through the node, The second transmit transaction identifier, ID2 (W) 218 in this example, is a unique identifier that is created for this particular transmission, as detailed above.

A receive happening 220 is generated when the packet is received at node B. The receive happening 220 includes a copy of the transmit happening 220 message ID, bit-range, source, and destination fields. The receive first transaction identifier ID1 (W) 227 is a copy of the transmit transaction identifier ID2 (W) 218, as detailed above, and serves to establish a correspondence between the transmit happening 210 and this receive happening 220. The receive second transaction identifier ID2 (-r-) 228 is a particular identifier that distinguishes receive happenings from transmit happenings.

In this example, node B is simulated as being a node that partitions received packets into smaller packets for subsequent transmission. Also in this example, node B is simulated as attempting to transmit the message to node C, but then transmitting the message to node D, simulating, for example, the lack of an acknowledge signal from node C at the physical layer during the transmission, and a subsequent rerouting determination. Nodes C and D are not illustrated in FIG. 2B.

A first transmit happening 230 is generated when node B initiates a transmission of a first packet to node C. The transmit happening 230 includes the same message identifier (M1) 231 as the receive happening 220, and identifies the portion (0-1K) 232 of the received bit-range (0-2 K) 222 that is included in the corresponding packet. Node C is identified as the destination 234, and the transmit start (T5) 235 and end (T6) 236 times are recorded, using the definitions as defined above. As detailed further below, the difference in times between the transmit start (T5) 235 and the receive end (T4) 226 identifies the delay incurred for processing the packet at node B. The transmit transaction ID1 (W) 237 is a copy of the receive happening's ID1 (W) 227, and this correspondence establishes the correspondence between the transmit start time (T5) 235 and the receive end time (T4) 226. The transmit transaction ID2 (X) 238 is a unique identifier of this transmission, as detailed above. Because, in this example, node B is simulated as being unable to communicate with node C, a receive happening will not be generated corresponding to this transmission, and the absence of a receive happening having an ID1 that matches the transmit happening's ID2 (X) 238 will identify the dropping of this transmission on the link between nodes B and C.

A second transmit happening 240 is generated when this packet is alternatively transmitted to node D. This happening 240 includes the same field entries as happening 230, except that node D is identified as the destination 244, the time of transmission (T7) 246 is recorded, and this transmission is given a unique transaction identifier ID2 (Y) 248.

A third transmit happening 250 is generated when the second portion (1-2K) of the received packet is transmitted. As illustrated, the bit-range field 252 identifies the corresponding bit range (1-2K), the time of transmission (T8) 256 is recorded, and the transmission is given a unique identifier ID2 (Z) 258.

Using the process described above, transmit and receive happenings are generated during simulation for all packets that are 'tagged' as containing at least a part of a message for an application of interest. To facilitate the identification and processing of 'tagged' packets, each packet is configured to contain a "message tag" that identifies any tagged-message portions within the packet. Preferably, the message tag provides an indication of the message ID and bit-range of each contained message portion, as well as an indication of the location of each portion in the packet. As packets are segmented and reassembled into subsequent transmit packets, the corresponding message tag information is copied from the received packet(s) message tag(s).

Figure 3:
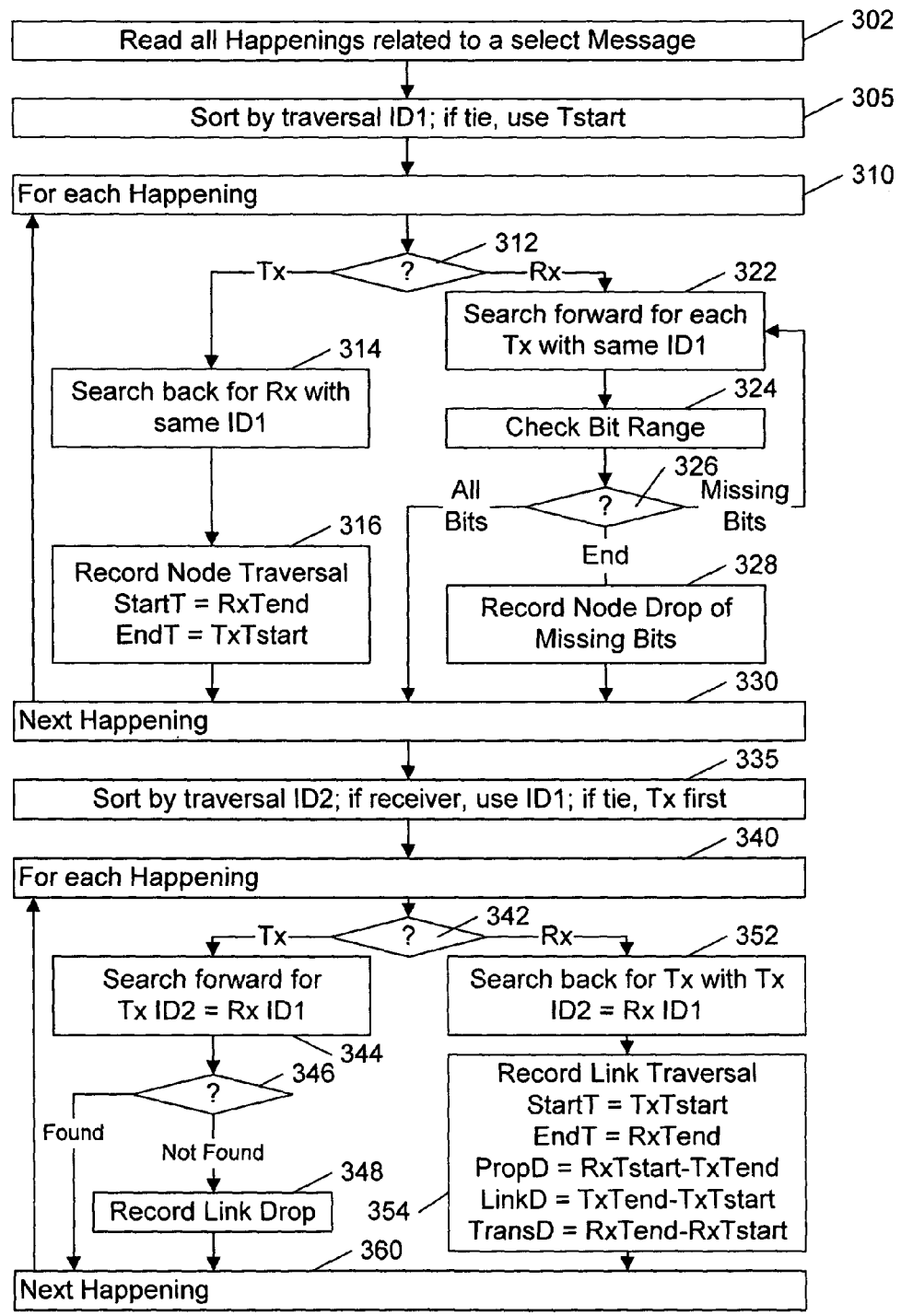
FIG. 3 illustrates an example flow diagram for processing transmit and receive records to identify node and link drops and traversals, with associated timing parameters.

FIG. 3 illustrates an example flow diagram for processing the stored happenings to derive timing information related to each tagged message. At 302, all of the happenings related to the select message are read, using the message identifier field.

The processing of the happenings associated with a message is structured in two parts: determining timing parameters related to the processing of packets at each node (blocks 305 through 330), and determining timing parameters related to the propagation of packets on links between nodes (blocks 335 through 360). One of ordinary skill in the art will recognize that the processing of the stored happening may be performed using alternative flow structures, particularly if different fields are used to record the happenings.

At 305 the happenings are sorted by the traversal ID1 field; the Tstart field is used to refine the sort when equal ID1 fields are found (e.g. matching receive and transmit happenings). The loop 310-330 processes each happening to determine timing parameters related to activities within each node. At 312, the type of happening (transmit or receive) is determined.

If the happening is a transmit happening, the happenings are searched backward to find the receive happening with a matching ID 1, at 314. The processing of the packet through the node (the node traversal) begins when the packet is completely received at the node (receive happening's Tend) and ends when the packet is ready for transmission (transmit happening's Tstart). These node traversal times are recorded, at 316.

If the happening is a receive happening, the happenings are searched forward to find each of the matching transmit happenings, at 322. Because received packets may be partitioned into multiple transmit happenings, the bit-range field of each transmit packet is compared to the received bit-range field of the receive packet, at 324. A determination is made, at 326, regarding whether all of the received bits were subsequently transmitted. If all of the received bits are included in the transmit happenings, at 326, the loop continues to the next happening. If some bits are determined not to have been transmitted, at 326, the search of the happenings at 322 continues. If, at 326, the end of the happenings is reached before all of the received bits are found in corresponding transmit happenings, the dropping of these missing bits at the node is recorded, at 328.

After all the happenings are processed to determine the activities at the node, the happenings are re-processed to determine the activities related to the link between nodes, at 335 through 360.

At 335, the happenings are re-sorted, using the traversal ID2 for transmit happenings, and ID1 for receive happenings. When a matching transmit ID2 and receive ID1 are found, the transmit happening is placed first in the list. Each happening is processed via the loop 340-360 to identify timing parameters related to the propagation of packets on links between the nodes. At 342, the type of happening (transmit or receive) is used to determine the subsequent processing of the happening.

If the happening is a transmit happening, the happenings are searched forward for a matching receive happening, wherein the receive happening's ID1 matches the transmit happening's ID2, at 344. If, at 346, a matching receive happening is found, the loop continues to the next happening; otherwise, a link drop is recorded, at 348.

If the happening is a receive happening, the happenings are searched backward for a matching transmit happening, wherein the receive happening's ID1 matches the transmit happening's ID2, at 352. The time spent traversing the link is measured from the time that the packet was available for transmission (transmit happening's Tstart) to the time the packet is completely received at the receiving node (receive happening's Tend). The time actually spent transmitting the packet (the propagation delay time) is measured from the time that the transmitting node sends the first bit (transmit happening's Tend) to the time that the first bit arrives at the receiving node (receive happening's Tstart). The time spent waiting for the link to be available (link delay/congestion delay) begins at the time that the packet was available for transmission (transmit happening's Tstart) and ends at the time that the transmitting node sends the first bit on the link (transmit happening's Tend). The time spent actually transmitting (transmit delay) is measured by the time between the times that the first and last bits arrive at the receiving node (receive happening's Tstart and Tend). These times are recorded, at 354, and the loop continues to the next happening, at 360.

It is significant to note that by recording each happening record independently, and processing the happening records using the two stable sorts presented above, the impact of this message/transaction-tracking capability on the time required to perform simulation and the time required to process the happenings is kept to an acceptable level that scales well as the size of the messaging increases. The impact on the simulation is substantially linear, and the time to process the happenings is in the order of N*logN, where N is the number of processed happenings.

All of the information that is recorded in the processing of happenings related to each message, such as illustrated in FIG. 3, is herein referred to as a 'message record'. This message record may be an explicit/discrete record, or merely a logical collection of independent records. For example, all node traversal delays may be located in one set of records, and all link traversal delays in another set of records; based on the message ID associated with each record in each set of records, a set of records comprising the message record can be defined, without actually creating a distinct set of such records. However, for ease and efficiency of subsequently processing this information, each message record is preferably formed as a discrete record, such as a linked-list that is accessible via the message ID.

As illustrated and described, by recording each transmit and receive happening for packets that contain messages related to an application, the flow of these packets through the nodes and links of the network can be traced, and recorded for each message. Based on these message records, a variety of timing parameters related to the processing and propagation of these application-related messages can be determined. The message ID is used to collate the traversals associated with each message, as well as collating messages related to a given transaction, and transactions related to a given application. The message ID may explicitly contain an identifier of the transaction and/or the application, or a list of messages related to each transaction and/or a list of transactions related to each application may be maintained independently.

The information collected regarding the communication of messages and packets related to select applications can be presented to a user in any of a variety of forms, the most common being via a graphic user interface. One of ordinary skill in the art will recognize that having identified a relationship between individual packets and the application(s) that caused the packets to be generated and propagated, the collating and presenting of timing relationships at a variety of levels between the physical protocol layer and the application layer are possible.

Figure 4:
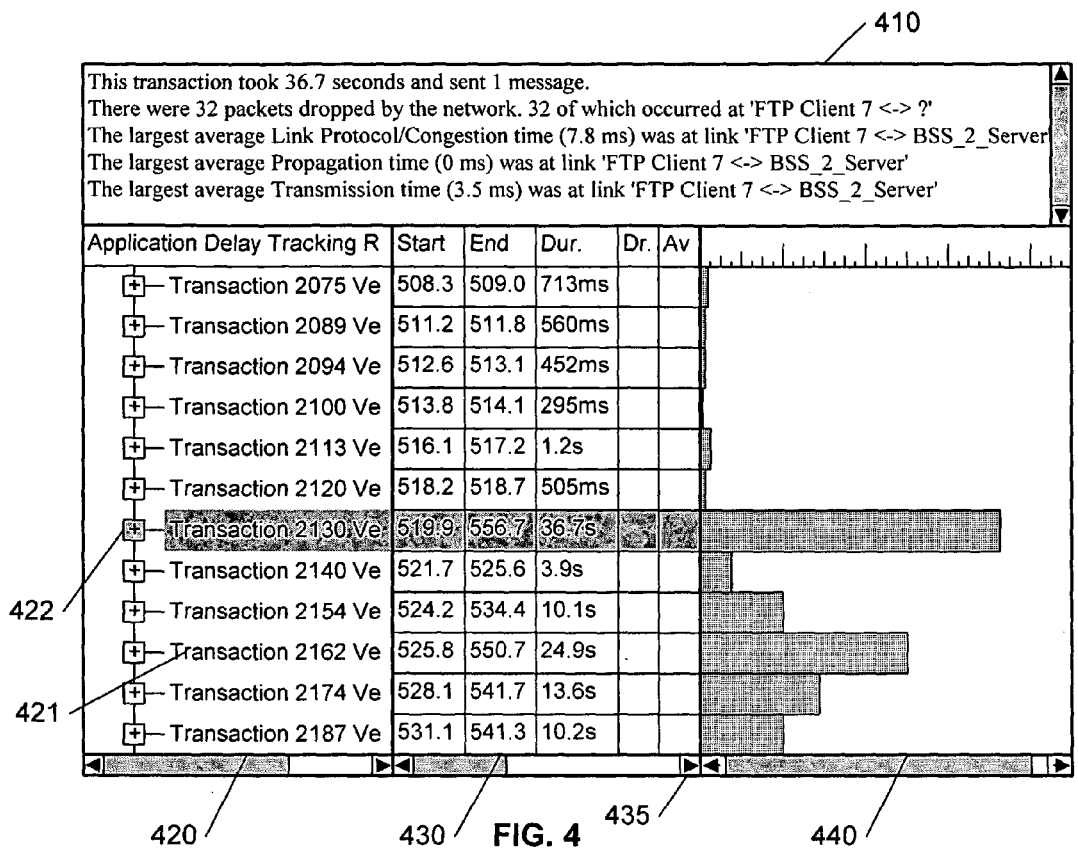
FIG. 4 illustrates an example graphic interface for presenting application level timing parameters and statistics.

FIG. 4 illustrates an example graphic interface for presenting application level timing parameters and statistics. In this example, summary statistics are presented in a summary field 410. Preferably, a set of predefined parameters are available for presentation, and a user is provided the option of adding or deleting parameters for presentation in this summary field. Upon initialization, and selection of the material to be displayed, this field contains summary information regarding the displayed material. As a user interacts with other fields in the interface, this field is correspondingly updated. For example, if a transaction is selected, the total duration of the transaction, the number of messages in the transaction, the number of drops during the transactions, the ratio of link and node traversal delays, and so on may be displayed. Similarly, if a message is selected, the summary information may include the size of the message, the duration to traverse the network, and the number of partitions of the message into packets used to communicate the message. If a node is selected, the summary information may include the number of packets that traversed the node for a particular message, an average number of packets per message, and so on. If a link is selected, a similar set of parameters may be displayed, as well as the more detailed statistics related to transmit, propagation, and congestion delays.

In the example of FIG. 4, a user has chosen to view the transactions related to the application. As noted above, the message ID may include an identifier of the transaction and application, or a separate list of all transactions related to an application may be maintained. Preferably, the user is provided the option of filtering the information that is presented. Such filtering may be based on the name/class/type of transaction, transactions within a given time interval, transactions having a duration greater than a threshold amount, transaction having a given number of messages, transactions with messages having certain characteristics, and so on. The user is also preferably given the option of selecting different arrangements of the presentation, including for example, a arrangement organized by client nodes, transactions, messages, and so on, with sub-sorts based on durations, start time, end time, and so on.

Field 420 displays an identifier of each transaction; field 430 displays the determined timing parameters for each transaction; and 440 displays select timing information in the form of a GANTT chart. Each transaction includes a 'drill down' button 422, which allows the user to view the selected transaction in more detail. For example, by clicking on the button 422, the individual messages comprising the transaction are displayed with their corresponding timing parameters; and, by drilling down further, the individual traversals can be displayed with their timing parameters. As noted above, the message ID may include an identifier of the transaction, or a separate list of messages associated with each transaction may be maintained. As also noted above, all of the determined node and link traversal parameters associated with each message (from FIG. 3) are included in each message record, from which the timing details for the individual packets can be displayed.

In this example, the user has selected transaction number 2130. This selection causes the transaction to be highlighted, and causes the display of summary information regarding this transaction to appear in field 410. The summary information includes, for example, the overall duration of the transaction (36.7 seconds), the number of messages communicated (1), the number of packets dropped by the network (32), and an identification of the link at which the highest number of drops occurred. Additionally, the summary information may include an identification of the possible bottlenecks in the network, from either a node-processing viewpoint, or a link-delay viewpoint. The timing information in field 430 includes the beginning and ending time of the transaction, its duration, and other parameters, which are viewable by adjusting the viewing window via the controls 435.

As discussed above, this transaction information is based on the collection of information regarding each message in the transaction, which information is based on the collection of information regarding each packet that conveyed any part of the message. As also discussed above, the information regarding each packet includes information related to both node and link traversals, so that the amount of time spent on processing the data related to the transaction can be distinguished from the amount of time spent on physically communicating the data over the links of the network. Although not illustrated, the graphical presentation of the data can be enhanced by color-coding the displayed information based on a characterization of the information presented. For example, link traversal durations may be displayed in a different color than node traversal durations, and so on.

In addition to the presentation of the timing information in interactive graphic form, FIG. 5 illustrates the presentation of the timing data in a table, or spreadsheet, form. The presentation of the information in this form allows the information to be subsequently processed and/or presented using a variety of analysis or display tools. Optionally, for example, this form could be used to provide the information to the graphic interface of FIG. 4. In like manner, the data can be provided to a set of filters and/or statistical analysis tools to provide additional summary and/or diagnostic information.

Figure 6:
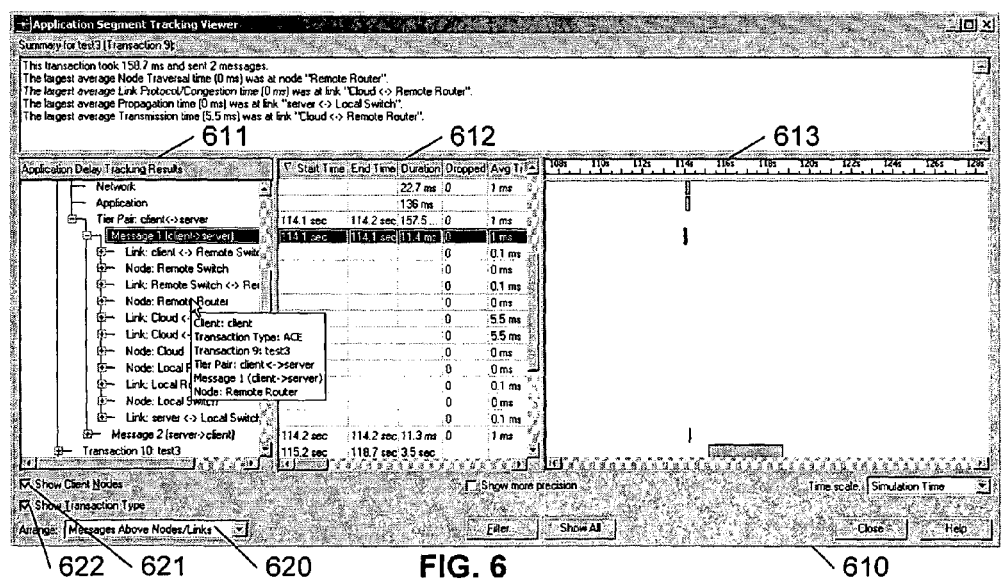
FIG. 6 illustrates an example screen shot of a "tree view" of the timing information arranged in hierarchical form.

FIG. 6 illustrates an example screen shot 610 of a "tree view" of the timing information arranged in hierarchical form. In this example, three row-synchronized panes 611, 612, and 613 are used. The first pane 611 illustrates the hierarchy in tree-form, using the conventional options of selectively displaying lower levels, if any, of each element in the hierarchy. The second panel 612 provides a tabular presentation of the detailed information regarding each of the corresponding displayed element of the hierarchy, and the third panel 613 provides a graphical presentation of the timing information. As illustrated, in a preferred embodiment, the graphical presentation is in the form of a GANTT-like chart that shows the duration of the selected element from its start time to its end time.

A variety of user-selectable and/or user-definable hierarchies are preferably provided. In the example of FIG. 6, the hierarchy is arranged as a Network-Application-Tier_Pair-Message-Node/Link hierarchy. A selection window 620 allows the user to change the hierarchical order, to include, for example, the Node/Link level above the Message level. These alternative arrangements are particularly well suited, for example, for determine which nodes a given message traversed (Message over Node/Link), or which messages a given node handled (Node/Link over Message). In like manner, other alternative hierarchies may be supported, such as the Tier_Pair level above the Application level, and so on.

Selection boxes 621 and 622 are also used to define the elements contained in the hierarchy and/or the levels included in the hierarchy. Of particular note, the selection boxes 621 and 622 facilitate the ordering of the hierarchy based on the client nodes that initiate the transactions, or on the types of transactions. In a preferred embodiment, a default arrangement of the hierarchy includes having the clients that initiate the transaction at the highest level, and the type of transactions at the lowest level.

In addition to the hierarchical presentation of the timing information, a preferred embodiment includes the use of one or more filters that control the selection, and non-selection, of messages for presentation. Preferably, a variety of predefined filters are selectable by the user, including filters that allow a user to specify a value or range of values for inclusion or exclusion from the display. For example, the transactions may be named or classified/typed, and the user can select which names or types to include or exclude. In like manner, transactions or messages can be filtered based on their start or end time, or a combination of both, and/or based on their size and/or duration. These filtering constraints may be absolute (e.g. messages more than 1KB in size), or relative (e.g. transactions accounting for more than 5% of the total delay), and may be expressed in either an inclusive or exclusive form.

In addition to hierarchical and/or filtered presentations, a preferred embodiment also allows the user to order the information presentation, either within the hierarchical and/or filtered presentations, of independent of these presentations. For example, the user may request to view all of the messages, sorted by the message size, independent of the tiers that processed these messages. In a preferred embodiment of this invention, the user is provided the option of sorting the message by any of the columns of the tabular detailed information in panel 612.

As is evident from a comparison of FIGS. 4 and 6, the GANTT-type diagrams may be presented using a variety of time frames, or time bases. For example, in FIG. 4, the time base is referenced to the start of each transaction, whereas in FIG. 6, the time based is referenced to a running clock, such as the simulation time. In a preferred embodiment, other time bases may be used, including a combination of a running clock and an independent start reference. For example, a display of the packets corresponding to a transaction can be presented using the start reference of "0" as the time that the particular transaction commenced, and each packet's duration can be presented along a continuing time scale based on this "0" starting point for the particular transaction.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements.

We claim:

1. A method comprising:
   simulating a modeled network on a computer system, including:
   identifying tagged messages among a plurality of simulated messages,
   generating tagged packets that contain the tagged messages, one or more of the tagged messages including a plurality of tagged packets, each tagged packet including an identifier of the corresponding tagged message, and
   simulating nodes in the simulated network that propagate the tagged packets,
   creating a transmit record for each tagged packet that is transmitted, and
   creating a receive record for each tagged packet that is received;
   processing the transmit and receive records to:
   identify node traversals of each tagged packet that traverses each node;
   identify link traversals of each tagged packet that traverses each link;
   determine timing information associated with select tagged messages based on the send and receive records corresponding to the node and link traversals and the identifiers of the select tagged messages; and
   displaying some or all of the timing information on a display device.

2. The method of claim 1, wherein identifying node traversals includes identifying each transmit record corresponding to each receive record; and identifying link traversals includes identifying each receive record corresponding to each transmit record.

3. The method of claim 1, including processing the transmit and receive records, including creating a message record for each tagged message, each message record including a set of node traversals and link traversals corresponding to the tagged message.

4. The method of claim 1, wherein each transmit record includes a first identifier of a received tagged packet at the node, and a second identifier of the transmitted tagged packet from the node, and each receive record includes an identifier of the transmitted tagged packet from another node.

5. The method of claim 4, wherein identifying node traversals includes finding the first identifiers of one or more transmitted tagged packets that match the identifiers of each received tagged packet.

6. The method of claim 5, wherein identifying link traversals includes finding the identifiers of received tagged packets that match the second identifiers of each transmitted tagged packet.

7. The method of claim 4, wherein identifying link traversals includes finding the identifiers of received tagged packets that match the second identifiers of each transmitted tagged packet.

8. The method of claim 3, wherein processing the transmit and receive records includes at least one of: identifying node drops, including identifying receive records that do not have corresponding transmit records, and identifying link drops, including identifying transmit records that do not have corresponding receive records.

9. The method of claim 8, including providing a display of at least one of the node drops and the link drops.

10. The method of claim 1, including providing a display of at least a portion of the timing information associated with the node and link traversals.

11. The method of claim 10, wherein the display includes a GANTT chart that illustrates a duration of each select tagged message.

12. The method of claim 11, wherein the GANTT chart includes a timescale that is relative to a simulation start time.

13. The method of claim 11, wherein the GANTT chart includes a timescale that is relative to a transaction start time.

14. The method of claim 10, wherein the timing information is organized as a hierarchy, and the display of the timing information facilitates a user's selection of levels of the hierarchy to be displayed.

15. The method of claim 14, including sorting the hierarchy based upon the timing information.

16. The method of claim 14, wherein a top level of the hierarchy corresponds to one or more client nodes that initiate transactions that include one or more messages.

17. The method of claim 16, wherein a lower level of the hierarchy corresponds to a type of the transactions.

18. The method of claim 14, wherein a top level of the hierarchy corresponds to types of transactions that include one or more messages.

19. The method of claim 14, including sorting the hierarchy based upon a user-specified filter criteria.

20. The method of claim 19, wherein the user specified filter criteria includes one or more of: a transaction name, a name of a client initiating a transaction, a transaction start time, a transaction duration, a number of messages in a transaction, a statistic of message duration, and a relationship between a plurality of statistics of message duration.

21. The method of claim 10, wherein the timing information includes classes of delay, including two or more of: node traversal delay, link traversal delay, transmission delay, propagation delay, and congestion delay.

22. The method of claim 21, wherein the classes of delay are illustrated using a plurality of colors.

23. The method of claim 22, wherein the display includes a GANTT chart that comprises a timescale that is relative to a packet transmission time, and one or more bars in the GANTT chart are colored proportionally to the classes of delay experienced by the representative message.

24. The method of claim 1, including providing a spreadsheet that includes the timing information.

25. The method of claim 1, wherein the timing information includes one or more summary statistics.

26. A system comprising:
   a simulator that is configured to simulate a modeled network, and includes a controller that is configured to:
   identify tagged messages among a plurality of simulated messages,
   generate tagged packets that contain the tagged messages, one or more of the tagged messages including a plurality of tagged packets, each tagged packet including an identifier of the corresponding tagged message,
   create a transmit record for each tagged packet that is transmitted, and
   create a receive record for each tagged packet that is received; and
   a transaction processor that is configured to process the transmit and receive records to:
   identify node traversals of each tagged packet that traverses each node,
   identify link traversals of each tagged packet that traverses each link, and determine timing information associated with select tagged messages based on the node and link traversals and the identifiers of the select tagged messages.

27. The system of claim 26, wherein identifying node traversals includes identifying each transmit record corresponding to each receive record, and identifying link traversals includes identifying each receive record corresponding to each transmit record.

28. The system of claim 26, wherein the transaction processor is configured to create a message record for each tagged message, each message record including a set of node traversals and link traversals corresponding to the tagged message.

29. The system of claim 26, wherein each transmit record includes a first identifier of a received tagged packet at the node, and a second identifier of the transmitted tagged packet from the node, and each receive record includes an identifier of the transmitted tagged packet from another node.

30. The system of claim 29, wherein the transaction processor is configured to identify node traversals based on a correspondence between the first identifiers of one or more transmitted tagged packets and the identifiers of each received tagged packet.

31. The system of claim 30, wherein the transaction processor is configured to identify link traversals based on a correspondence between the identifiers of received tagged packets and the second identifiers of each transmitted tagged packet.

32. The system of claim 29, wherein the transaction processor is configured to identify link traversals based on a correspondence between the identifiers of received tagged packets and the second identifiers of each transmitted tagged packet.

33. The system of claim 26, wherein the transaction processor is configured to: identify node drops by identifying receive records that do not have corresponding transmit records, and identify link drops, by identifying transmit records that do not have corresponding receive records.

34. The system of claim 33, wherein the transaction processor is configured to provide a display of at least one of the node drops and the link drops.

35. The system of claim 26, including a display that is configured to display at least a portion of timing information associated with the node and link traversals.

36. The system of claim 35, wherein the display is configured to display a GANTT chart that illustrates a duration of each select tagged message.

37. The system of claim 36, wherein the GANTT chart comprises a timescale that is relative to a simulation start time.

38. The system of claim 36, wherein the GANTT chart comprises a timescale that is relative to a transaction start time.

39. The system of claim 35, wherein the timing information is organized as a hierarchy, and the transaction processor is configured to facilitate a user's selection of levels of the hierarchy to be displayed.

40. The system of claim 39, wherein the transaction processor is configured to selectively sort the hierarchy based upon the timing information.

41. The system of claim 39, wherein a top level of the hierarchy corresponds to client nodes that initiate transactions that include one or more messages.

42. The system of claim 41, wherein a lower level of the hierarchy corresponds to types of the transactions.

43. The system of claim 39, wherein a top level of the hierarchy corresponds to types of the transactions.

44. The system of claim 39, wherein the transaction processor is configured to selectively sort the hierarchy based upon user-specified filter criteria.

45. The system of claim 44, wherein he user-specified filter criteria includes one or more of: a transaction name, a name of a client initiating a transaction, a transaction start time, a transaction duration, a number of messages in a transaction, a statistic of message duration, and a relationship between a plurality of statistics of message duration.

46. The system of claim 35, wherein the timing information includes classes of delay, including two or more of: node traversal delay, link traversal delay, transmission delay, propagation delay, and congestion delay.

47. The system of claim 46, wherein the display is configured to display the classes of delay using a plurality of colors.

48. The system of claim 26, wherein the transaction processor is configured to provide a spreadsheet that includes the timing information.

49. The system of claim 26, wherein the timing information includes one or more summary statistics.

50. A method comprising:
   simulating a modeled network on a computing device, including:
      simulating communication of messages among nodes of the network, at least one of the messages including a plurality of packets,
      tagging each packet of each message of a plurality of the messages with a corresponding message identifier, and
      for each tagged packet, recording a start time and the corresponding message identifier in a start time record of a plurality of start time records, and recording an end time and the corresponding message identifier in an end time record of a plurality of end time records,
   processing the pluralities of start and end time records to identify the start and end time of one or more select messages based on the message identifiers, and
   graphically displaying the start time and the end time of the one or more select messages on a display device.

51. The method of claim 50, wherein recording the start time and message identifier for each message includes creating a message start time record that includes the start time and the message identifier of the message; and recording the end time and message identifier for each message includes creating a message end time record that includes the end time and the message identifier of the message.

52. The method of claim 50, wherein displaying the start time and end time of each select message includes illustrating a duration of each select message on a GANTT chart.

53. A system comprising:
   a simulator that is configured to simulate communication of messages among nodes of a modeled network, at least one of the messages including a plurality of packets, the simulator including:
   a controller that is configured to:
      tag each packet of each message of a plurality of the messages with a corresponding message identifier,
      for each tagged packet, record a start time and the message identifier in a start time record of a plurality of start time records, record an end time and the message identifier in an end time record of a plurality of end time records,
   a transaction processor that is configured to process the pluralities of start and end time records to determine the start and end times of one or more select messages based on the message identifier, and a display that is configured to graphically display the start time and the end time of the one or more select messages based on the recorded information.

54. The system of claim 53, wherein the display is configured to display the start time and end time of each select message on a GANTT chart that illustrates a duration of the message.

* * * * *